(12) United States Patent
Crall et al.

(10) Patent No.: US 7,434,253 B2
(45) Date of Patent: Oct. 7, 2008

(54) USER MAPPING INFORMATION EXTENSION FOR PROTOCOLS

(75) Inventors: Christopher J. Crall, Seattle, WA (US); Gennady Medvinsky, Issaquah, WA (US); Joshua Ball, Lake Forest Park, WA (US); Karthik Jaganathan, Redmond, WA (US); Paul J. Leach, Seattle, WA (US); Liqiang Zhu, Kirkland, WA (US); David B. Cross, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 166 days.

(21) Appl. No.: 11/181,525

(22) Filed: Jul. 14, 2005

(65) Prior Publication Data

US 2007/0016782 A1      Jan. 18, 2007

(51) Int. Cl.
*H04L 9/32*           (2006.01)
*H04L 9/00*           (2006.01)
(52) U.S. Cl. ............................ 726/10; 726/14; 713/175
(58) Field of Classification Search .................. 713/176
See application file for complete search history.

(56) References Cited

U.S. PATENT DOCUMENTS

| | | | |
|---|---|---|---|
| 5,712,914 A * | 1/1998 | Aucsmith et al. | 380/30 |
| 6,615,347 B1 * | 9/2003 | de Silva et al. | 713/156 |
| 6,754,829 B1 * | 6/2004 | Butt et al. | 726/8 |
| 6,854,056 B1 * | 2/2005 | Benantar et al. | 713/156 |
| 7,139,911 B2 * | 11/2006 | Sweeny et al. | 713/156 |
| 7,143,285 B2 * | 11/2006 | Gindin et al. | 713/156 |
| 2002/0138738 A1 * | 9/2002 | Sames et al. | 713/185 |
| 2002/0144107 A1 * | 10/2002 | Sweeny et al. | 713/156 |
| 2003/0009662 A1 * | 1/2003 | Gindin et al. | 713/156 |
| 2004/0162980 A1 * | 8/2004 | Lesenne et al. | 713/153 |
| 2005/0257045 A1 * | 11/2005 | Bushman et al. | 713/156 |
| 2006/0095767 A1 * | 5/2006 | Krishnamurthi et al. | 713/168 |

OTHER PUBLICATIONS

Lynn, C. et al. RFC 3779: X.509 Extensions for IP addresses and AS identifiers. Jun. 2004. IETF. p. 1-26.*
Farrell, S. TLS extensions for AttributeCertificate based authorization. Aug. 20, 1998. p. 1-10.*

(Continued)

*Primary Examiner*—Christian LaForgia
(74) *Attorney, Agent, or Firm*—Woodcock Washburn LLP (57) ABSTRACT

A hint containing user mapping information is provided in messages that may be exchanged during authentication handshakes. For example, a client may provide user mapping information to the server during authentication. The hint (e.g., in the form of a TLS extension mechanism) may be used to send the domain/user name information of a client to aid the server in mapping the user's certificate to an account. The extension mechanism provides integrity and authenticity of the mapping data sent by the client. The user provides a hint as to where to find the right account or domain controller (which points to, or otherwise maintains, the correct account). Based on the hint and other information in the certificate, the user is mapped to an account. The hint may be provided by the user when he logs in. Thus, a certificate is mapped to an identity to authenticate the user. A hint is sent along with the certificate information to perform the binding. Existing protocols may be extended to communicate the additional mapping information (the hint) to perform the binding. A vendor specific extension to Kerberos is defined to obtain the authorization data based on an X.509 certificate and the mapping user name hint.

12 Claims, 4 Drawing Sheets

OTHER PUBLICATIONS

Blake-Wilson, S. et al. RFC 3546: Transport Layer Security (TLS) Extensions. Jun. 2003. p. 1-28.*

Kohl, J. et al. RFC 1510: The Kerberos Network Authentication Service (V5). Sep. 1993. p. 1-106.*

"Step-by-Step Guide to Mapping Certificates to User Accounts," Microsoft Corporation, http://www.microsoft.com/windows2000/techinfo/planning/security/mappingcerts.asp, posted Feb. 16, 2000, 15 pages.

* cited by examiner

USER MAPPING INFORMATION EXTENSION FOR PROTOCOLS

BACKGROUND OF THE INVENTION

A certificate is a digitally signed statement that contains information about an entity and the entity's public key. A handshake is a dialogue between two entities (e.g., a user and a computer, a computer and another computer, or a program and another program) used for identification and authentication of the entities to one another. Mapping the certificate to a user account or a security principal, pursuant to a handshake, often fails if the certificate does not provide enough information for identifying the user's identity or realm.

An example of a service that uses certificates and handshakes is Secure Channel. Secure Channel, also known as Schannel, is the name of a security support provider (SSP) under a security service provider interface (SSPD) that implements SSL/TLS (secure sockets layer/transport layer security) protocols. SSPI contains a number of security protocol implementations. The Schannel SSP plugs in under SSPI. Also, a Kerberos SSP plugs in under SSPI. Schannel is primarily used for Internet applications that require enhanced security for Hypertext Transfer Protocol (HTTP) communications such as through SSL or TLS. Schannel protocols, such as TLS or SSL for example, require credentials to authenticate servers and, optionally, clients. Server authentication, where the server provides proof of its identity to the client, is required by the Schannel security protocols. Client authentication may be requested by the server at any time.

Schannel credentials may be X.509 certificates. Public and private key information from certificates is used to authenticate the server and, optionally, the client. These keys are also used to provide message integrity while the client and the server exchange the information required to generate and exchange session keys.

Schannel is the module that implements SSL and TLS, a client/server protocol that is used to establish user authentication on the server. This authentication leads to a token that can be used by the server for client impersonation. Schannel uses certificates to authenticate the user (mapping the certificate to a user account).

Once the user (client) identifies himself to the server, the server must locate the authority (for the user's account). This is typically accomplished through the use of the user principal name (UPN) extension in the X.509 certificate. However, if the UPN is absent or if the UPN does not provide enough information for identifying the user's realm (in cross forest scenarios), mapping the certificate to a user account (e.g., an Active Directory user account) will fail.

A similar problem exists for mapping the certificate to user accounts by Kerberos using S4U.

SUMMARY OF THE INVENTION

User mapping information (in the form of a "hint", for example) is provided in authentication protocols. For example, a client provides user mapping information to the server during authentication. The hint is used to help identify where the user account is located, thereby providing the ability to map a certificate to the user account.

For example, the data format (e.g., the on the wire format) may be changed for the TLS protocol for sending the domain name and user name information. For example, the hint (e.g., in the form of a TLS extension mechanism) is used to send the domain/user name information to aid the server in mapping the user's certificate to an account. The TLS extension mechanism provides integrity and authenticity of the mapping data sent by the client.

On the server side, information from the protocol layer is extracted and mapped, and used to map the user certificate to an account and generate a security (user impersonation) token.

Similarly, an extension to the Kerberos protocol allows for a mapping hint and certificate to be supplied and a user token to be returned.

DETAILED DESCRIPTION OF ILLUSTRATIVE EMBODIMENTS

A hint containing user mapping information is provided in messages that may be exchanged as part of a client/server authentication and key exchange step. For example, a client may provide user mapping information to the server during authentication. The hint (e.g., in the form of a TLS extension mechanism) may be used to send the domain/user name information of a client to aid the server in mapping the user's certificate to an account. The extension mechanism provides integrity and authenticity of the mapping data sent by the client. The user provides a hint as to where to find the right account or domain controller (which points to, or otherwise maintains, the correct account). Based on the hint and other information in the certificate, the user is mapped to an account. The hint may be provided by the user when he logs in.

Thus, a certificate is mapped to an identity to authenticate the user. A hint is sent along with the certificate information to perform the binding. Existing protocols may be extended to communicate the additional mapping information (the hint) to perform the binding.

Figure 1:
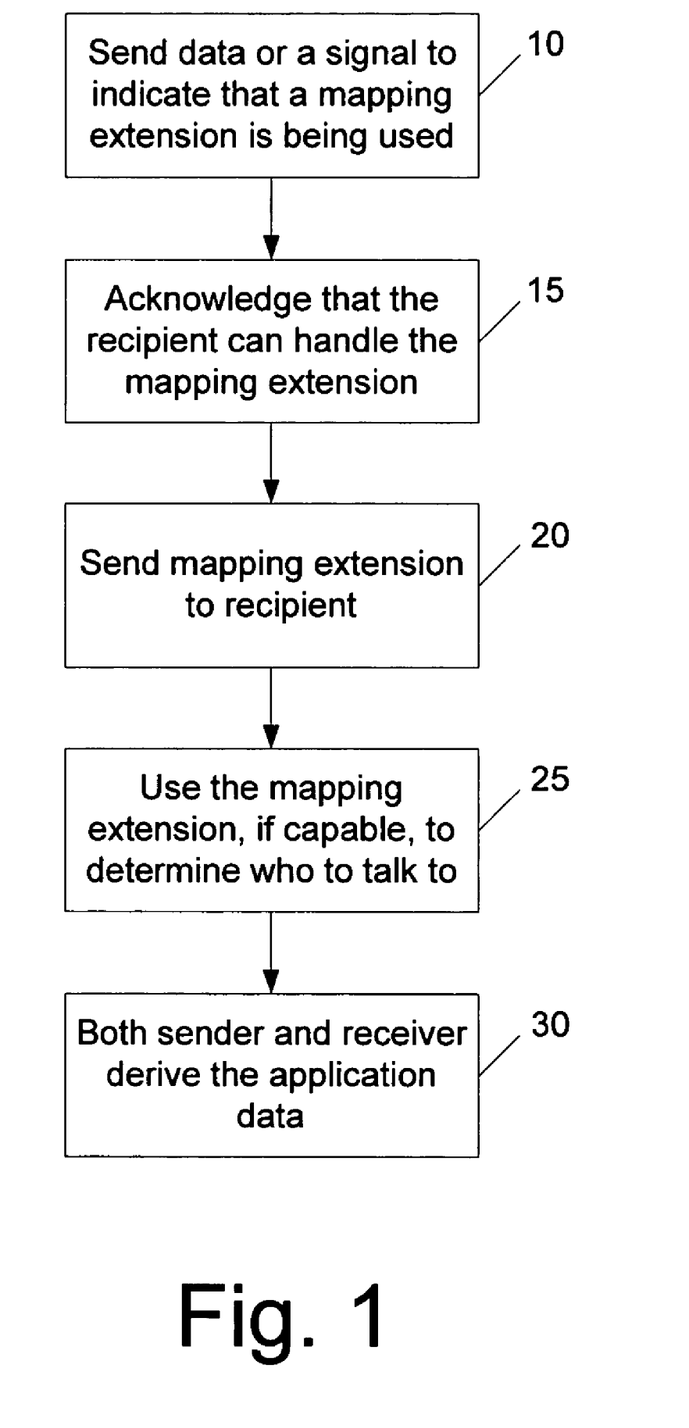
FIG. 1 is a flow diagram of an exemplary mapping method.

FIG. 1 is a flow diagram of an exemplary mapping method. At step 10, the client sends data or a signal to the server to indicate that a mapping extension (containing mapping information or a hint, for example) is being used. The server will acknowledge that it can or cannot handle the extension, at step 15. The mapping extension is sent to the server, at step 20, as UserMappingData, as a hash, for example. If the server can handle the extension, the server uses the mapping extension data (the hint), at step 25, to determine who to talk to. Both sides then derive the application data, at step 30.

A provider (e.g., Schannel) is desirably extended to send mapping information comprising the user's principal name (UPN) and domain to aid the server side to perform the mapping of certificate to user account. This is particularly useful in cases where the UPN is not in the certificate itself and in deployments with multiple active directories. The mapping information may also be a common name or an account name, for example.

Figure 2:
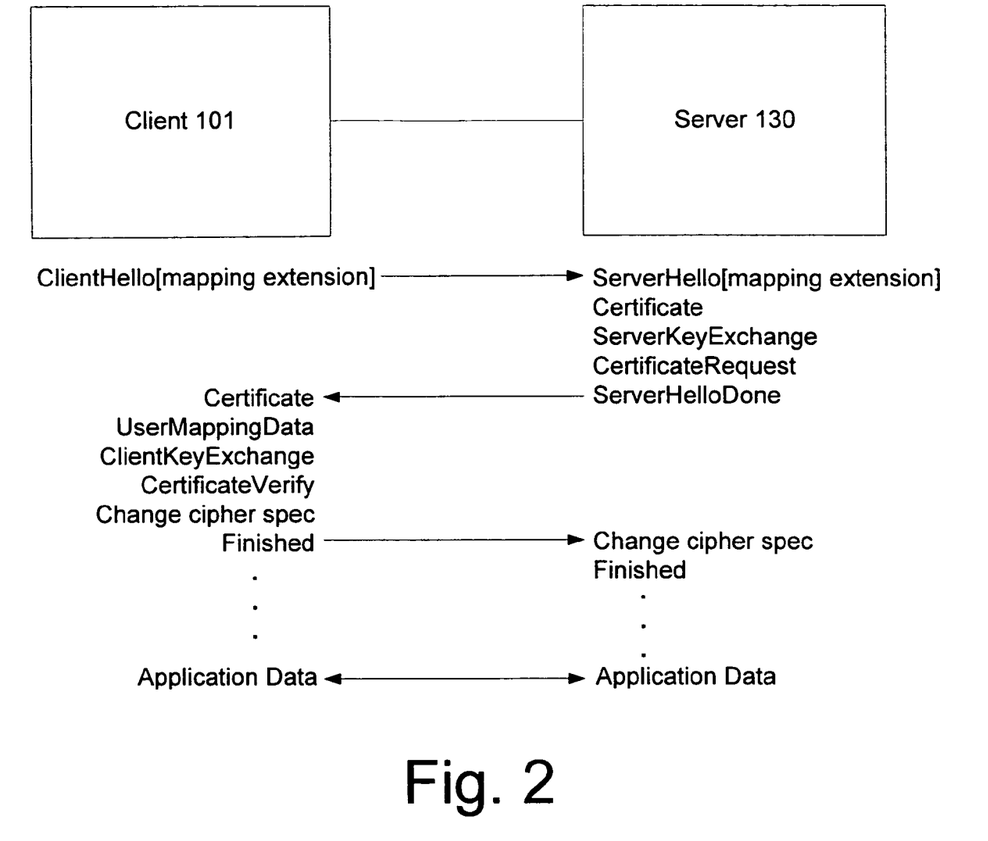
FIG. 2 is a diagram of an exemplary client-server mapping system with handshake.

An example SSL handshake, described with respect to the client-server mapping system of FIG. 2, supports mutual authentication based on the client's and server's X.509 certificates and provides for subsequent confidentiality and integrity of the client/server communication channel via a session key that is derived from a master secret.

The UPN and the domain name (where the user account is located) are desirably specified and sent during the handshake. After the handshake is complete, the information is verified as secure by both parties, to ensure that no middle man has tampered with the information.

For client side authentication, a security support or protocol provider (e.g., Schannel) may send the user's certificate and corresponding signature in "Certificate" and "CertificateVerify" messages, respectively. On completion of the handshake, the server side may attempt to map the certificate to a user account in order to generate an impersonation token.

FIG. 2 illustrates how the user mapping information may be integrated into a handshake, such as a TLS handshake. Although a TLS handshake is described, it is contemplated that the invention may be used with respect to any protocol involving handshakes, certificates, and/or authentication. In the initial "Hello" message exchange, the client 101 and server 130 negotiate whether a mapping extension is supported (e.g., via a new extension type that may be added to the extension portion of client and server hellos). The user mapping data (e.g., principal and domain name) is desirably sent in a new message (e.g., "user_mapping_data") which follows the user certificate message.

As noted above, regarding TLS messages, transferring user mapping information from the client to the server may use TLS extensions. A new extension (e.g., user_mapping) may be established and sent in the client hello. If the server has placed the same extension (user_mapping) in the server hello, this will signify to the client that the server understands this extension. If the server does not understand the extension, it will respond with a non-extended server hello and the client will proceed as normal, ignoring the extension.

If the new extension is understood, the client will inject a new handshake message prior to the client's certificate message. The positioning of this message allows the server to receive the mapping information before it must validate (and map) the certificate. The server will then parse this message, extracting the client's domain, and store it in the context for use when cert mapping.

The "server processing" is contained completely in the mapping functions. At this point, if the extension information is there, it is used, otherwise processing proceeds as normal. Desirably, there is no error for not having an extension.

Because the client is the initiator of this extension, it is determined when the client will send the user mapping information. Although this information could always be sent, it may not be desirable to broadcast this information to just any server at any time, because it can reveal network infrastructure that the client and server are using. On the other hand, when the information is revealed, no attempt to conceal it may be made.

To avoid superfluously sending the user mapping information, various example techniques may be used to throttle its dissemination such as (1) the client will only send the extension if it is agreed upon in the "Hello" exchange, thereby preventing the information from being sent to a server that does not understand the user mapping extension, and (2) the client will only send the user mapping information if the server is on a list of "safe" domains to send to. This list may be established in the registry, for example.

Figure 3:
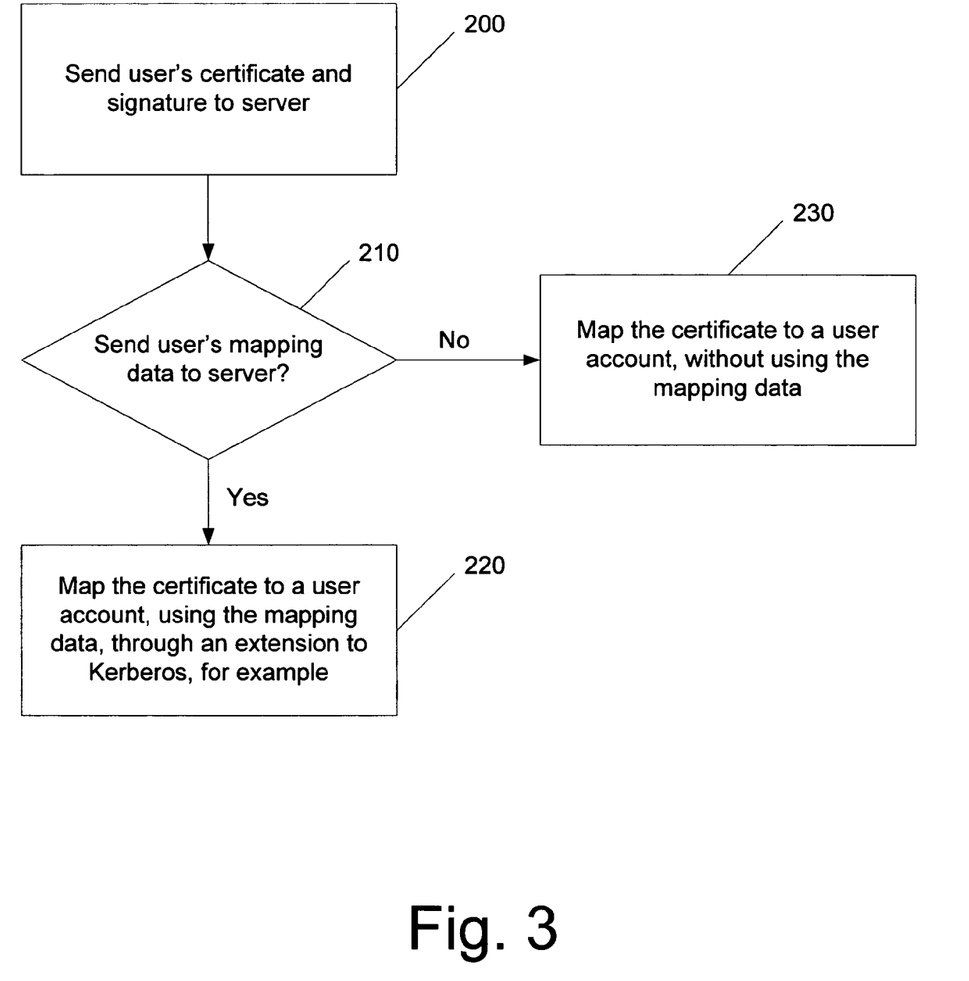
FIG. 3 is a flow diagram of another exemplary mapping method.

Thus, as shown in FIG. 3, a method may include sending a certificate and signature from a user (e.g., a client) to a recipient (e.g., a server), at step 200. It may then be determined at step 210 whether or not the recipient should be sent the hint or mapping information. If so, then at step 220, the hint or mapping information is sent to the recipient and the certificate is mapped to a user account, using the hint or mapping information. If the recipient should not be sent the hint or mapping information, the certificate is attempted to be mapped to a user account, without benefit of the hint, at step 230.

Gathering the user mapping information to be sent can be handled either programmatically or interactively. For example, to establish a credential for use in Schannel, the user (e.g., a client program acting on behalf of an end user) may build an SCHANNEL_CRED structure and pass it to AcquireCredentialsHandle( ). The SCHANNEL_CRED structure allows the user to supply a certificate (CERT_CONTEXT) that ACH( ) then uses to build a credential (which in turn attaches the client's certificate). Alternatively, the user may not specify a certificate, and have Schannel select the user's default certificate.

As an example of how a hint may be implemented, to extract the UPN and DNS domain name, GetUserNameEx( ) may be called twice using the EXTENDED_NAME_FORMAT of NameUserPrincipal, and NameDnsDomain. Both of these may be attached to the PSPCredentialGroup structure. An example hint for a user name would be provided in a message as UNICODE_STRING UserPrincipalName. An example hint for a domain name would be provided in a message as UNICODE_STRING DomainName.

As an example, InitializeSecurityContext( ) receives as one of its parameters the target of the context (that is, the name of the server it is establishing a secure context with). InitializeSecurityContext will call CheckUserMappingTarget( ) and set the following PSPContext structure flag to the result:
    BOOL fSendMappingExtension By default, this flag will be unset, so that the client will not send the extension. A debug log will indicate the decision to set or leave the flag.

As a further example, if the user mapping extension was successfully negotiated, the UPN and domain will desirably be placed in the PSPContext structure. The information will be used at the beginning of the mapping process, and passed to a version of certificate based LsaLogonUser( ) (S4U2Self).

Aspects of the above examples were directed to a protocol involving SSL and TLS. Aspects of the invention may also be embodied in protocols such as Kerberos. A Kerberos extension may supply a certificate and optionally the user name that the certificate is mapped to. The KDC (key distribution center) may perform the account mapping and validation and send back the authorization data that can be used by the client to construct a token to be used for authorization, for example.

More particularly, for example, a LsaLogonUser( ) call may include a hint. Name hints are passed to LsaLogonUser( ). For example, in a message, a UNICODE_STRING DomainName, //OPTIONAL, if supplied, is used to locate the forest; and a UNICODE_STRING UserName, //OPTIONAL, if supplied, is used to locate the account. The domain name tells the client (e.g., the local machine a user is logging into) which domain contains the mapped user account.

The caller is permitted to supply the user name to enable the certificate be mapped to multiple user accounts. If the user name is supplied, the KDC will use that to locate the user account, and verify that the certificate is mapped to this account.

If the user name hint is not supplied and the domain name is supplied, the domain name is used by the Kerberos client to locate the KDC for authentication, and KDC will map the certificate to a user account. It is desirable to support client certificates that do not contain the subjectAltName extension.

Such certificates may be mapped to Active Directory accounts. A generic and extensible solution is provided for the certificate to account mapping problem.

If the certificate contains subjectAltName/UPN extension, KDC will use that to map the client. In this case, the client certificate desirably satisfies the NT_AUTH policy. If no user object is found based on the UPN, the authentication should fail.

If there is no UPN in the certificate, the KDC constructs the "X509:<I><S>" AltSecID name to lookup. In this case, the client certificate does not need to satisfy the NT_AUTH policy.

If there is no UPN in the certificate and no user object has been located in the steps above, the client account may be looked up based on the Distinguished Name of the subject, the KDC constructs the "X509:<S>" AltSecID name to lookup. In this case, the client certificate desirably satisfies the NT_AUTH policy.

If there is no UPN in the certificate and no user object is located in the steps above, the KDC uses the subject and serial number to construct the "X509:<I><SR>" AltSecID name to lookup. In this case, the client certificate does not need to satisfy the NT_AUTH policy.

If there is no UPN in the certificate and no user object is located, and the client certificate contains an SKI, the KDC constructs the "X509:<SKI>" AltSecID name to lookup. In this case, the client certificate does not need to satisfy the NT_AUTH policy.

If there is no UPN in the certificate and no user object is located in the steps above, the KDC constructs the "X509:<SHA1-PUKEY>" AltSecID value to lookup. In this case, the client certificate does not need to satisfy the NT_AUTH policy.

If there is no UPN in the certificate and no user object is located in the steps above, the client account is looked up based on the SAN/822name, the KDC constructs the "X509:<RFC822>" AltSecID to lookup. In this case, the client certificate desirably satisfies the NT_AUTH policy.

Note that the above steps and criteria can be used alone, or in any combination or sequence. Additional steps and criteria may be also be used. Desirably, the first step or criteria that successfully locates an account wins, and the search stops. But there may be a configuration error if there are two mapping methods that map the same certificate to different user accounts.

Note if the client's certificate does not have a UPN and the client's DN in the certificate matches with a user account's DN, but that user account is not mapped, then the authentication should fail.

Exemplary Computing Environment

Figure 4:
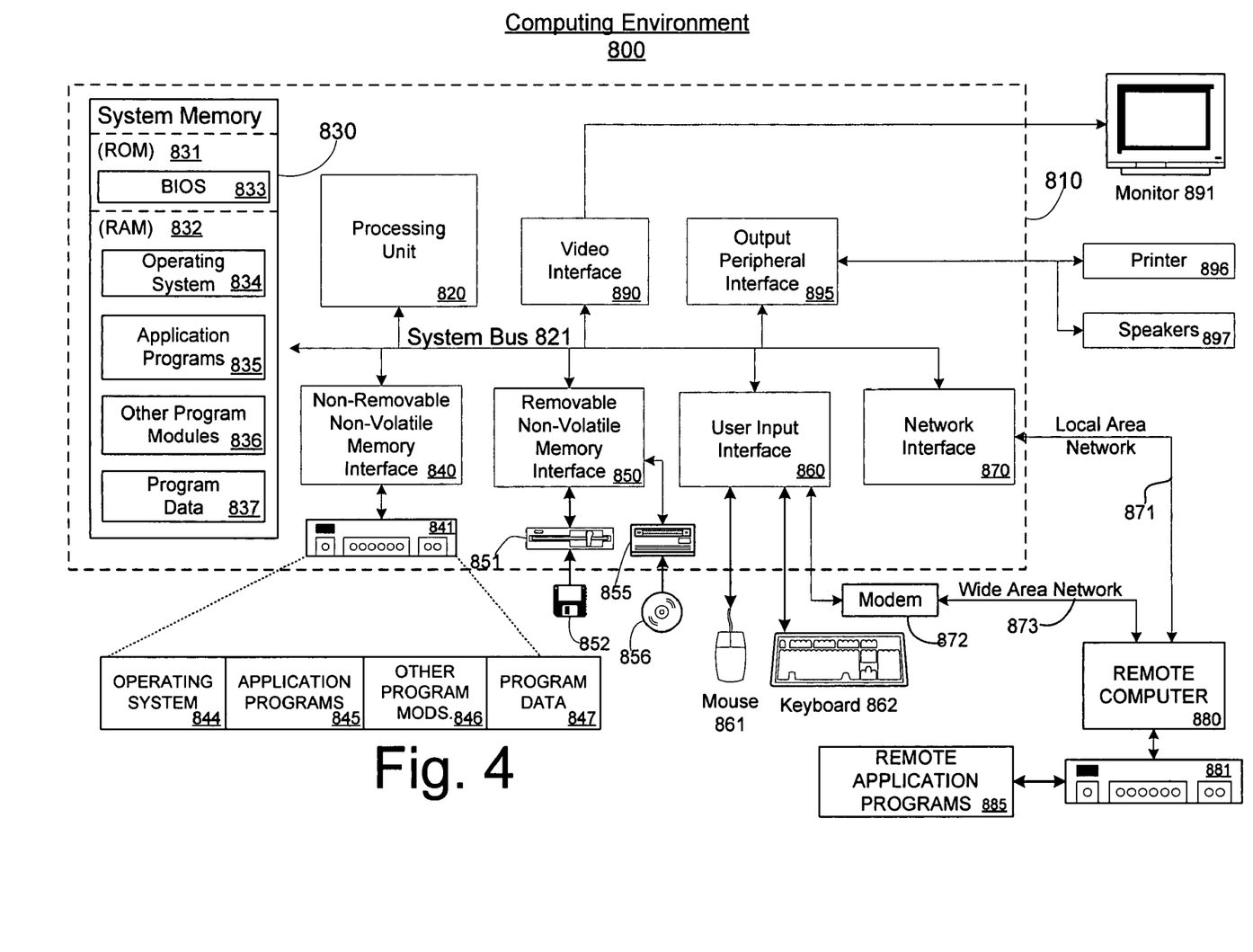
FIG. 4 is a block diagram showing an exemplary computing environment in which aspects of the invention may be implemented.

FIG. 4 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837.

The computer 810 may also include other removable/non-removable, volatile/non-volatile computer storage media. By way of example only, FIG. 4 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 4. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. An authentication method for authenticating a first computing device to a second computing device, the authentication method comprising the first computing device sending to the second computing device a certificate identifying the first computing device to the second computing device, and the second computing device at least attempting to map the certificate to an account of the first computing device at an authentication server, the method further comprising:
- sending a mapping extension indicator from the first computing device to the second computing device separate from the sending of the certificate, the mapping extension indicator specifying that the first computing device can send to the second computing device mapping information to aid the second computing device in locating the account of the first computing device at the authentication server;
- acknowledging from the second computing device to the first computing device that the second computing device can accept the mapping information separate from the sent certificate pursuant to the received mapping extension indicator;
- sending the mapping information from the first computing device to the second computing device separate from the sending of the certificate; and
- locating, by the second computing device, the account of the first computing device at the authentication server based on the sent mapping information.

2. The method of claim 1, wherein the authentication server comprises a domain controller.

3. The method of claim 1, farther comprising deriving application data after locating the account or the authentication server and verifying the application data.

4. The method of claim 1, further comprising sending said certificate from the first computing device to the second computing device.

5. The method of claim 4, further comprising mapping a user to an account based on the mapping information and the certificate.

6. The method of claim 4, further comprising mapping the certificate to a user account using the mapping information.

7. The method of claim 1, further comprising determining whether the second computing device supports the mapping information, and if so, acknowledging that the second computing device can accept the mapping information, and sending the mapping information to the second computing device.

8. The method of claim 1, wherein the mapping information comprises a domain name hint or a user name hint.

9. The method of claim 1, wherein the mapping information is in the form of a protocol extension mechanism.

10. The method of claim 1, further comprising authenticating a user based on the mapping information and the certificate.

11. The method of claim 1, further comprising determining whether the second computing device supports the mapping information prior to sending the mapping information to the second computing device.

12. The method of claim 11, further comprising acknowledging to the first computing device that the second computing device can accept the mapping information.

* * * * *

UNITED STATES PATENT AND TRADEMARK OFFICE
CERTIFICATE OF CORRECTION

| | | |
|---|---|---|
| PATENT NO. | : 7,434,253 B2 | Page 1 of 1 |
| APPLICATION NO. | : 11/181525 | |
| DATED | : October 7, 2008 | |
| INVENTOR(S) | : Christopher J. Crall et al. | |

It is certified that error appears in the above-identified patent and that said Letters Patent is hereby corrected as shown below:

In column 9, line 27, in Claim 3, delete "farther" and insert -- further --, therefor.

Signed and Sealed this

Third Day of May, 2011

David J. Kappos
*Director of the United States Patent and Trademark Office*